United States Patent [19]
Campbell et al.

[11] Patent Number: 5,460,349
[45] Date of Patent: Oct. 24, 1995

[54] EXPANSION VALVE CONTROL ELEMENT FOR AIR CONDITIONING SYSTEM

[75] Inventors: Chester D. Campbell, Rancho Santa Margarita; Sandra L. Harper, Dana Point; Virender Jain, Lake Forest; Richard L. Kenyon, Irvine, all of Calif.; Alan Matthies, Milwaukee, Wis.; Roger G. Riefler, Brandon, Miss.; Roy M. Yabuki, Los Angeles; Ashok Zopey, Anaheim Hills, both of Calif.

[73] Assignee: Parker-Hannifin Corporation, Cleveland, Ohio

[21] Appl. No.: 154,674

[22] Filed: Nov. 18, 1993

Related U.S. Application Data

[63] Continuation of Ser. No. 961,563, Oct. 15, 1992, abandoned, which is a continuation-in-part of Ser. No. 951,259, Sep. 25, 1992, Pat. No. 5,252,939.

[51] Int. Cl.$^6$ .................................................. F16K 31/02
[52] U.S. Cl. .................................... 251/129.15; 236/75
[58] Field of Search ........................... 251/175, 129.07, 251/129.15, 129.21, 333, 340; 137/625.33; 236/92.8, 12.2, 75

[56] References Cited

U.S. PATENT DOCUMENTS

| | | | |
|---|---|---|---|
| 2,663,307 | 12/1953 | Birdwell | 251/343 X |
| 3,089,627 | 5/1963 | Lippig | 251/175 X |
| 3,136,336 | 6/1964 | Priesmeyer | 251/175 X |
| 4,067,541 | 1/1978 | Hunter | 251/129 |
| 4,339,109 | 7/1982 | Kawata et al. | 251/129 |
| 4,362,027 | 12/1982 | Barbier | 62/197 |
| 4,419,642 | 12/1983 | Kramer et al. | 335/227 |
| 4,425,767 | 1/1984 | Barbier | 62/212 |
| 4,437,645 | 3/1984 | Nomura et al. | 251/65 |
| 4,448,038 | 5/1984 | Barbier | 62/212 |
| 4,452,424 | 6/1984 | Kawata | 251/129 |
| 4,459,819 | 6/1984 | Hargraves | 62/217 |
| 4,483,369 | 11/1984 | Akagi et al. | 137/625.12 |
| 4,523,436 | 6/1985 | Schedel et al. | 62/222 |
| 4,530,374 | 7/1985 | Akagi et al. | 137/625.3 |
| 4,548,047 | 10/1985 | Hayashi | 62/160 |
| 4,614,327 | 9/1986 | Valbjorn et al. | 251/129.16 |
| 4,632,358 | 12/1986 | Orth et al. | 251/117 |
| 4,638,973 | 1/1987 | Torrence | 251/129.02 |
| 4,697,608 | 10/1987 | Kolze et al. | 137/1 |
| 4,750,704 | 6/1988 | Brundage | 251/30.02 |
| 4,817,914 | 4/1989 | Pick et al. | 251/129.15 |
| 4,892,285 | 1/1990 | Torrence | 251/129.05 |
| 4,896,860 | 1/1990 | Malone | 251/129.05 |
| 4,954,799 | 9/1990 | Kumar | 335/236 |
| 4,988,074 | 1/1991 | Najmolhoda | 251/129.08 |
| 5,046,702 | 9/1991 | Miyazawa et al. | 251/129.04 |
| 5,067,687 | 11/1991 | Patel et al. | 251/129.08 |
| 5,139,227 | 8/1992 | Sumida et al. | 251/129.08 |

FOREIGN PATENT DOCUMENTS

| | | | |
|---|---|---|---|
| 0147357 | 7/1985 | European Pat. Off. | |
| 0538926 | 4/1993 | European Pat. Off. | |
| 1254923 | 11/1967 | Germany | 251/175 |
| 2011660 | 9/1971 | Germany | 251/175 |

*Primary Examiner*—William E. Wayner
*Attorney, Agent, or Firm*—Rankin, Hill, Lewis & Clark

[57] ABSTRACT

An expansion valve (10) for heat transfer systems such as an air conditioning system, includes a control element (20) for controlling the flow rate of working fluid through the valve. The control element has a stem member (28) and movable member (42) movable on the stem member. Openings (38) to an internal passage (30) in the stem member are regulated by positioning the movable member to achieve regulated flow rate of refrigerant material through the valve. The movable member of the control element is moved by a plunger (24) of a proportional solenoid (22). The proportional solenoid has a magnetic flux circuit including a low permeance isolation tube (62) surrounding the plunger, which enables removal of the coil (76) and frame (78) of the solenoid from the valve. The solenoid further includes a variable permeance flux washer (69) the flux through which varies with plunger position, which is disposed from a gap (82) which provides an area of magnetic saturation. The proportional solenoid produces force/displacement characteristics which enable precise control of the control element and accurate regulation of the refrigerant flow rate through the valve.

22 Claims, 5 Drawing Sheets

EXPANSION VALVE CONTROL ELEMENT FOR AIR CONDITIONING SYSTEM

CROSS REFERENCE TO RELATED APPLICATION

This Application is a continuation of application Ser. No. 07/961,563 filed Oct. 15, 1993 now abandoned, which is a continuation-in-part of Ser. No. 07/951,259 filed Sep. 25,1992, now U.S. Pat. N. 5,252,939, the disclosures of which are incorporated herein by reference.

TECHNICAL FIELD

This invention relates to heat transfer systems. Specifically this invention relates to an expansion valve for a vehicle air conditioning system.

BACKGROUND ART

Heat transfer systems, such as air conditioning systems and heat pump systems, are well known in the prior art. In such systems a working fluid which can be any one of a number of refrigerant materials is used to transfer heat from one region to another.

The working fluid typically passes through a system that includes an evaporator, a compressor, a condenser and an expansion device. Of course the system may also include other components such as an accumulator or a receiver/dryer.

In an air conditioning application the evaporator is positioned in the space to be cooled and the condenser is positioned in the area to which heat removed from the cooled space is transferred. Working fluid in the vapor state is pumped by the compressor into the condenser. In the condenser the working fluid rejects heat and condenses to a liquid.

The liquid working fluid passes from the outlet of the condenser into an expansion device. Expansion devices known in the prior art include fixed orifices, capillary tubes and expansion valves.

From the expansion device the working fluid flows to the evaporator wherein it absorbs heat and undergoes a change of phase from liquid to vapor. The refrigerant vapor then flows back to the compressor to begin another pass through the system.

The expansion device is an important element of the system. The amount of working fluid that passes through the expansion device is a controlling factor in the amount of cooling that can be achieved. However, because the temperature of both the space being cooled and the space to which heat transferred vary, the pressure and temperature of the liquid working fluid entering the expansion device also varies. This impacts the cooling capabilities of the system and affects the flow rate that must be obtained through the expansion device to achieve the optimum cooling effect. In mobile systems such as those used as air conditioning or refrigeration systems on vehicles, the properties of the working fluid delivered to the expansion device can vary widely.

Due to the variable operating conditions of vehicle heat transfer systems, fixed opening expansion devices such as orifices and capillary tubes are sometimes used to reduce cost but are not preferred. Instead, expansion valves that provide variable refrigerant flow rates are more desirable.

Prior art expansion valves have traditionally controlled flow by passing the fluid through an internal opening in the valve and employing a movable restricting body or other element in close proximity to the opening. Moving the restricting body closer to the opening reduces flow. Conversely, moving the restricting body away from the opening increases flow through the valve.

In prior art expansion valves the position of the restricting body has been controlled by an actuator. A common actuator is a diaphragm type which is mounted on the valve. The actuator opens or closes flow through the expansion valve in response to fluid pressure both inside the valve and from a control source.

The control source fluid pressure for moving the restricting body is delivered from a sealed bulb which holds a carefully determined fluid charge. The bulb is commonly mounted adjacent to the outlet line from the evaporator. When the temperature of the working fluid exiting the space to be cooled begins to increase, the temperature of the bulb also increases. As the pressure of the fluid inside the bulb increases it moves the diaphragm and the blocking body inside the expansion valve to increase the flow rate of working fluid to the evaporator. The increased flow of working fluid provides more cooling and eventually the temperature at the outlet of the evaporator drops. When this occurs the pressure inside the bulb falls, moving the diaphragm and the restricting body to reduce the flow rate of working fluid through the valve. The charge in the bulb is contrived to have a small amount of superheat in the refrigerant leaving the evaporator.

A problem with this type of prior art actuator is that the expansion device is constantly seeking the optimum rate of flow. The response time renders the expansion device unable to react properly to changing conditions. This is particularly a problem in vehicle applications where changes in cooling loads and variations in refrigerant properties are common. As a result, the accuracy of control is also less than optimum.

Others have previously used electrically controlled expansion valves to control the flow of working fluid in a heat transfer system. These systems typically use valves that are either fully open or fully closed. The valve is periodically opened and closed for controlled time periods to achieve an overall average flow rate that is designed to handle the heat transfer load at the evaporator.

A significant problem with such pulse width modulated expansion valves is that they must open and close very frequently. This causes rapid wear of the valve components. The opening and closing action also often causes "hammering" in the system. The vibration associated with hammering may cause fatigue and premature failure of the valve and the connected tubing. It also makes accurate pressure measurement impossible.

The control elements used in prior art expansion valves for controlling or regulating the flow of working fluid also have drawbacks. The valves that meter flow must be made to deal with the static and dynamic pressure effects created by the working fluid as it passes through the valve. In some designs efforts are made to use the pressure of the working fluid to develop balancing forces. These balancing forces enable more precise movement of the restricting body or other control element. This is intended to enable more precise control of the flow rate.

The problem with attempts to design expansion valves that make use of such balancing forces is that the forces vary substantially with the fluid conditions and the flow rate. As a result it has been difficult to produce an expansion valve that provides accurate control of fluid flow over a wide range of operating conditions.

Thus there exists a need for an expansion valve for heat transfer systems that provides accurate flow control for the working fluid under a wide range of operating and flow conditions.

DISCLOSURE OF INVENTION

It is an object of the present invention to provide an expansion valve that accurately controls the flow of working fluid therethrough.

It is a further object of the present invention to provide an expansion valve that includes a control element that minimizes the influence of flow and pressure effects.

It is a further object of the present invention to provide an expansion valve that includes a proportional solenoid actuator that accurately controls flow through the control element.

It is a further object of the present invention to provide an expansion valve that minimizes vibration and has a long useful life.

It is a further object of the present invention to provide an expansion valve that has few moving parts, is economical to manufacture and is readily repaired.

It is a further object of the present invention to provide an expansion valve that can be operated with flow in either direction.

Further objects of the present invention will be made apparent in the following Best Modes for Carrying Out Invention and the appended claims.

The foregoing objects are accomplished in the preferred embodiment of the invention by an expansion valve for controlling the flow of refrigerant material flowing to an evaporator of a heat transfer system, such as a vehicle air conditioning system. The valve has a body with an inlet for receiving liquid refrigerant material and an outlet for delivering expanded refrigerant material.

The expansion valve includes a control element between the inlet and the outlet for controlling the flow rate of refrigerant material through the valve. The control element has a cylindrical stem member with an internal passage. The stem member has a cylindrical outer surface. The outer surface preferably includes a pair of opposed longitudinally elongated openings.

The control element further includes a movable member mounted for movement on the outside of the stem member. The movable member is movable through a range positions between a first position wherein the valve is fully open and a second position wherein the valve is fully closed.

In a first embodiment, the control element is configured to be a normally closed element. However in other embodiments the valve may be configured to be normally open. The control element is not significantly influenced by flow or pressure forces, and is thereby enabled to provide an accurate rate of flow depending on the position of the movable member. It also accomodates flow in either direction through the element.

The movable member of the control element is positioned by a proportional solenoid actuator. The proportional solenoid actuator is constructed with a novel low friction plunger as described in U.S. Pat. No. 5,252,939 filed Sep. 25, 1992, the disclosure of which is incorporated herein by reference.

The proportional solenoid actuator also includes a novel removable coil design that facilitates repair or replacement of the actuator. The solenoid actuator also includes a novel magnetic flux circuit that includes a low permeance, non-magnetic isolation tube in series with a variable permeance element. This construction provides a proportional solenoid that achieves accurate positioning of the movable member of the control element in response to electrical signals delivered to the proportional solenoid actuator.

Accurately positioning the control element of the valve through movement of the proportional actuator, enables accurate flow control through the expansion valve and precise control of the cooling effects of the system in which the expansion valve is used.

BEST MODES FOR CARRYING OUT INVENTION

Figure 1:
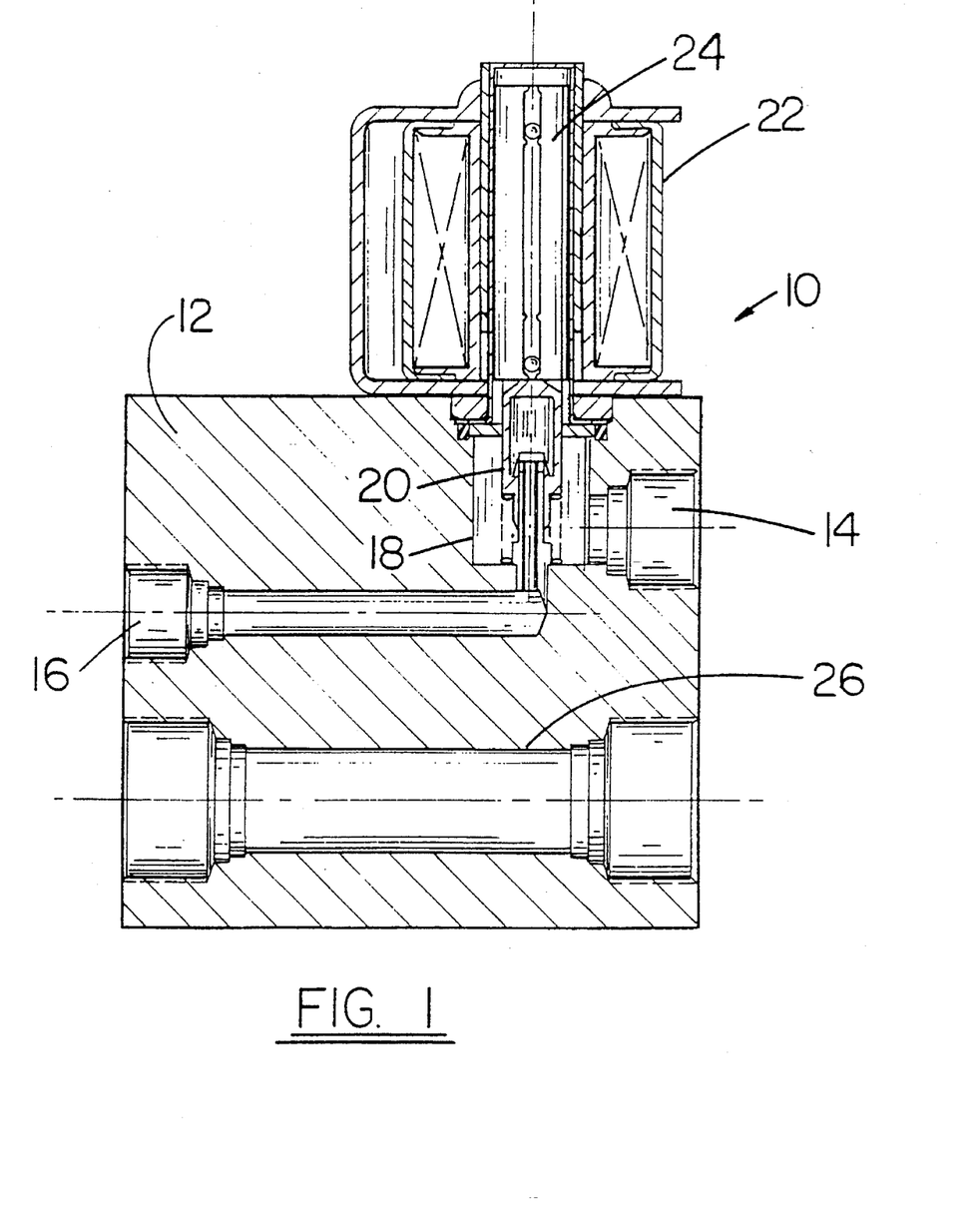
FIG. 1 is a cross sectional view of a first embodiment of the expansion valve of the present invention.

Referring now to the drawings and particularly to FIG. 1, there is shown therein a first embodiment of the expansion valve of the present invention generally indicated 10. The valve has a body 12. The body 12 includes an inlet 14 for receiving liquid refrigerant working fluid. The valve also has an outlet 16 for delivering expanded working fluid to an evaporator or other exothermic heat exchanger.

The body 12 further includes a chamber 18. A control element 20 is positioned in chamber 18. As later explained, fluid passing from inlet 14 to outlet 16 of the valve is required to pass through the control element.

Valve 10 further includes a proportional solenoid 22. Solenoid 22 includes a movable plunger element 24. Plunger element 24 is a low friction type plunger of the type described in U.S. Pat. No. 5,252,939, filed Sep. 25, 1992, the disclosure of which is incorporated herein by reference. As later described in detail, plunger element 24 is controlled to move downward in response to electrical signals supplied to the proportional solenoid 22.

Body 12 of valve 10 further includes a return passage 26. Return passage 26 provides a path for working fluid from the evaporator as it returns to the compressor and the remainder of the system (see FIG. 7). Return passage 26 provides a convenient location for sensors for detecting the character and properties of the refrigerant material leaving the evaporator. However, in other embodiments of the invention the expansion valve need not include a return passage through body 12.

Figure 2:
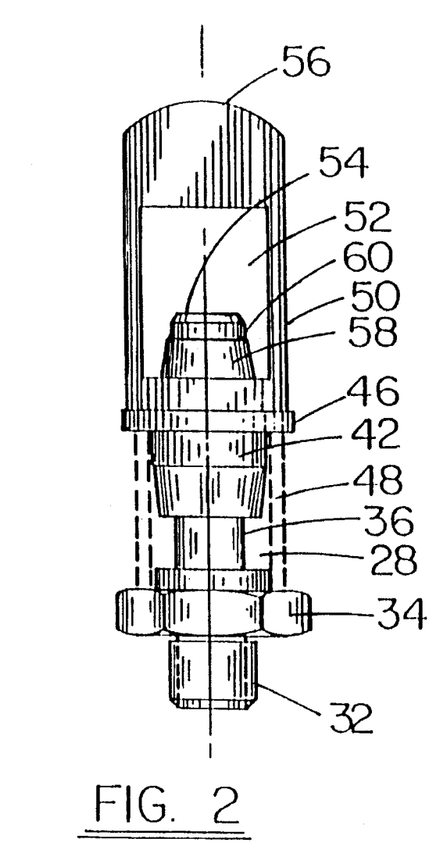
FIG. 2 is a side view of a normally closed control element of the expansion valve shown in FIG. 1.
Figure 3:
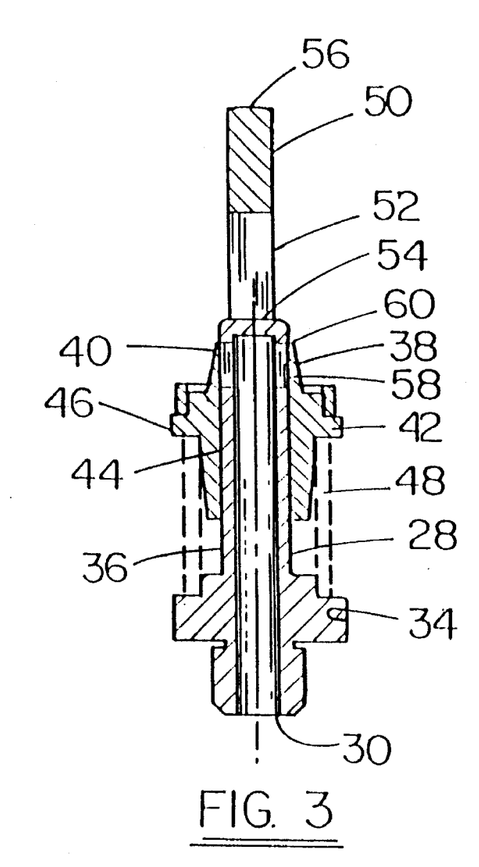
FIG. 3 is a cross sectional side view of the control element shown in FIG. 2.

Control element 20 is shown in greater detail in FIGS. 2 and 3. Control element 20 has a stem member 28 that includes an internal passage 30. The stem member has a threaded lower portion 32 for attaching to a similarly threaded opening in body 12 (not separately shown) which is in fluid communication with outlet 16. The stem member 28 also has a hex area 34 to facilitate installation and removal of the control element from the valve.

Stem member 28 includes a cylindrical outer surface 36. A pair of opposed longitudinally elongated openings 38 extend on outer surface 36. Openings 38 are in fluid communication with internal passage 30 through ducts 40. Ducts 40 are similarly configured to openings 38.

Control element 20 further includes a movable member 42. Movable member 42 has a cylindrical inner surface 44 that is slightly larger in diameter than outer surface 36 of stem member 28. As a result, movable member is axially movable on stem member 28.

Movable member 42 includes an enlarged flange area 46. Flange area 46 is in abutting relation at its lower side with a compression spring 48 as shown in FIGS. 2 and 3. Compression spring 48 biases the movable member upward as shown in the drawings.

The upper surface of flange area 46 supports a cap portion 50 of the movable member. Cap member 50 includes a open area 52 that enables it to move downward on stem member 28 a significant distance without engaging a closed top area 54 of the stem member. Cap portion 50 also has a rounded plunger engaging portion 56. Plunger engaging portion 56 of movable member 42 engages plunger 24 as shown in FIG. 1, as the movable member is biased against the plunger by spring 48.

Movable member 42 further includes tapered peripheral surface 58. Peripheral surface 58 is tapered as shown in FIGS. 2 and 3 such that it is substantially thinner at a terminating edge 60.

As shown in FIGS. 2 and 3, spring 48 biases movable member 42 upward, and the peripheral surface 58 of the movable member covers openings 38 in the outer surface of stem member 28 when no downward force is applied by the plunger of the actuator. As the control element is biased towards the position in which openings 38 are covered, it is a normally closed element. As discussed later in conjunction with the description of the embodiment of the control element shown in FIGS. 4 and 5, other embodiments of the expansion valve of the present invention may have normally open control elements.

When movable member 42 is moved in a direction downward as shown in FIGS. 2 and 3, peripheral surface 58 moves to uncover openings 38 in stem member 28. As a result, the area outside the control element in chamber 18 is in fluid communication with internal passage 30 of the control element, and outlet 16 of the valve, through ducts 40. The extent to which openings 38 are uncovered determines the flow rate of refrigerant material through the control element, and thus the flow rate from the inlet to the outlet of the expansion valve.

Figure 6:
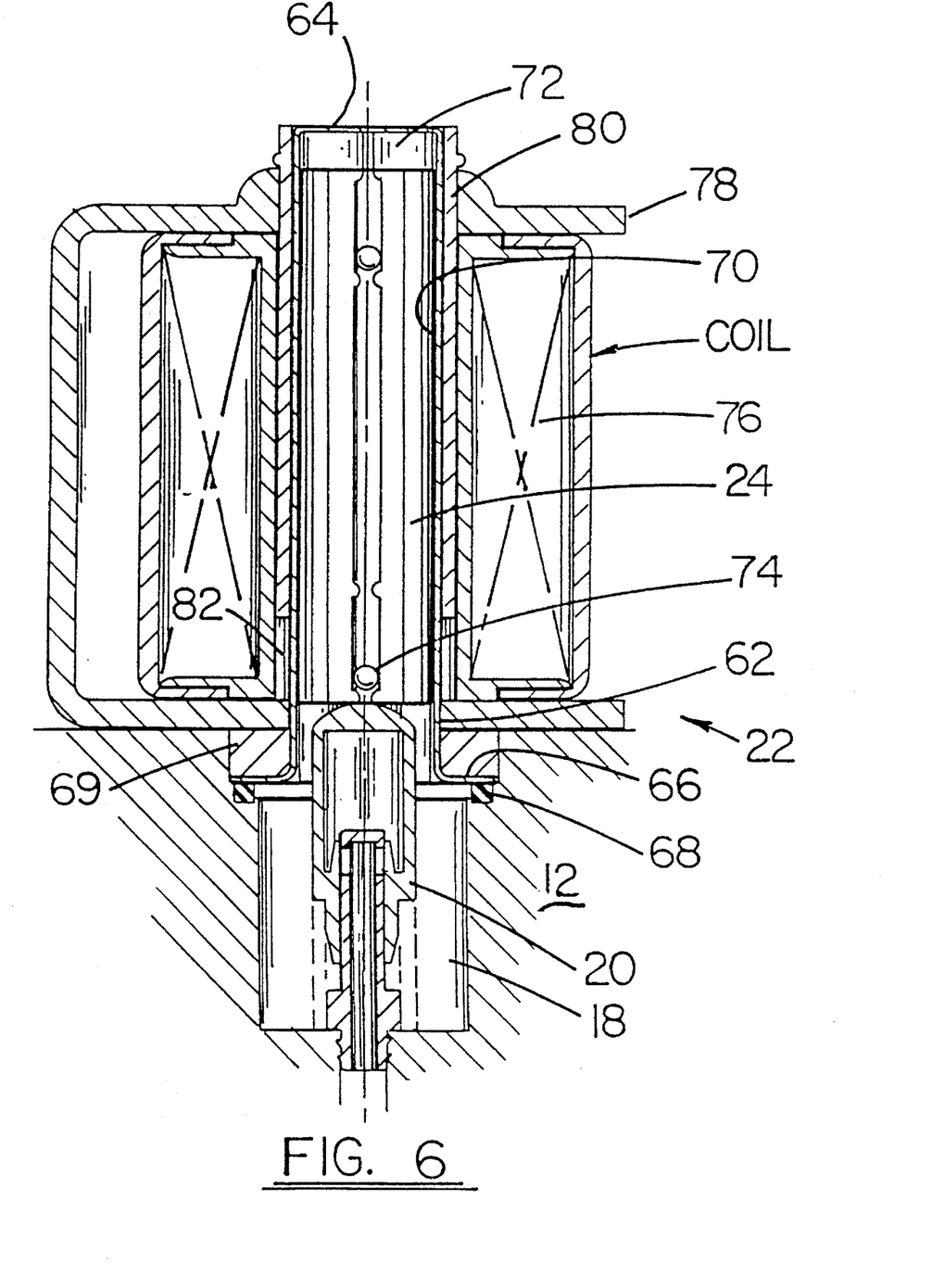
FIG. 6 is a cross sectional view of the proportional solenoid actuator of the expansion valve shown in FIG. 1.

The proportional solenoid 22 of the expansion valve is shown in greater detail in FIG. 6. The proportional solenoid 22 includes an isolation tube 62. Isolation tube 62 is generally cylindrical and has a closed top 64. Isolation tube 64 also has a flanged bottom 66 which nests in a recess (not separately shown) in body 12. In the preferred form of the invention isolation tube 66 is made of non-magnetic stainless steel material having approximately one-half inch O.D. and a 0.012 inch thick wall. The body 12 is preferably made of non-magnetic aluminum alloy.

A resilient seal 68 is positioned under flange bottom 66 of isolation tube 62. Seal 68 serves to provide a fluid tight seal which prevents the working fluid in chamber 18 from escaping around the isolation tube through the recess. The isolation tube is fixed in position as shown by fastening means (not shown). A flux washer 69 made of magnetic material is positioned in the recess above flange bottom 66 of the isolation tube. The preferred form of the flux washer is sized with an opening that accepts the isolation tube, has a one inch O.D. and is 0.180 inches thick. The purpose of flux washer 69 is later described in detail.

The isolation tube 62 has a cylindrical surface 70. Plunger 24 is movable inside an internal area 72 of the isolation tube. Internal area 72 is bounded by interior surface 70. As described in U.S. Pat. No. 5,252,939, plunger 24 includes rollable bodies 74 that roll between the surface of plunger and the interior surface 70 of the isolation tube. Further, the isolation tube provides a radial gap in which there is no magnetic material between the plunger and the lower portion of the frame. This radial gap is approximately 0.20 inches. This construction enables plunger 24 to move with virtually no frictional resistance.

Proportional solenoid 22 further includes a wound wire coil 76 for providing an electromagnetic field when electrical power is supplied thereto. Coil 76 is supported in a frame 78 made of magnetic material that is u-shaped in cross section. A cylindrical sleeve 80 extends part way through the center of coil 76. A longitudinal gap 82 extends between the bottom of sleeve 80 and the lower portion of frame 78 as shown in FIG. 6. In the preferred embodiment the length of this longitudinal gap is 0.300.

In the preferred embodiment of the invention the inside diameter of sleeve 80 is slightly larger than the outside diameter of isolation tube 62. In addition, in the preferred embodiment, frame 78 may be releasably attached to body 12 of the valve. This enables the coil and frame assembly to be removed from the valve without releasing any of the refrigerant working fluid 20 from the system. This makes it easier to repair or replace the coil of the solenoid actuator.

An operation of the expansion valve, when no electrical power is applied to coil 76, the spring 48 of control element 20 biases plunger 24 upward to the position shown in FIGS. 1 and 6. Supplying power to coil 76 creates an electromagnetic field. The electromagnetic field produces a flux circuit about solenoid 22. The flux circuit extends through the sleeve 80, the frame 78 and the flux washer 69. However, gap 82 causes magnetic saturation in the area of the gap.

The plunger functions as a member for completing the magnetic flux circuit. Flux washer 69 serves as a variable permeance element as its permeance varies with the distance the plunger 24 is displaced downward. As electrical power delivered to the coil of the solenoid actuator increases, the magnetic saturation at the gap 82 also increases. This causes the plunger to move downward until the force reaches an equilibrium with the biasing force of the spring of the control element.

By varying the amount of power delivered to the coil of the proportional solenoid, the position of the plunger and the movable member 42 of the control element may be precisely controlled. As a result, the rate of flow of working fluid through the valve is also accurately regulated.

The proportional solenoid of the present invention is novel in that unlike conventional solenoids the force it produces does not increase exponentially as the plunger approaches the end of its stroke. This enables the solenoid actuator to achieve a force versus stroke characteristic that enables precise and repeatable movement.

Solenoid 22 is further novel in that although it is a proportional solenoid, it is removable from the body of the valve. This facilitates repair or replacement. Prior art type proportional solenoids have not generally been used in expansion valves because they could not tolerate a low permeance structure between the coil sleeve and the plunger. In the present invention however, a low permeance non-magnetic isolation tube is positioned between the magnetic sleeve and the plunger element. The presence of this low permeance tube actually enhances the ability of the plunger to move. This is believed to occur because the low permeance element maintains the plunger away from other magnetic elements and reduces resistance to movement that occurs when a magnetic element that is attracted to the plunger is immediately adjacent thereto.

It will be understood by those skilled in the art, that although the preferred embodiment of the invention uses an air gap to achieve a saturation area, in other embodiments a non-magnetic spacer or thinned area of the sleeve may be used. Likewise, although the preferred embodiment includes a flux washer as a variable permeance element, other embodiments may use other types of elements that exhibit increasing permeance with plunger stroke.

In operation of the proportional solenoid, as greater electrical power is delivered to coil 76 plunger 24 moves in a downward direction as shown in FIG. 1. Because movable member 42 is engaged with plunger 24, it likewise moves downward. This opens flow through openings 38 in the outer surface of the stem member 28. As a result, working fluid on the outside of the control element in chamber 28 flows through the control element and into the internal passage of the stem member. Because openings 38 are elongated, the further the movable member moves downward the greater the flow through the control element.

The configuration of the control element enables precise control of the flow therethrough in response to the displacement of the movable member. In addition, because the movement of the movable member to open and close the control element is perpendicular to the direction of fluid flow, the fluid acts equally on all surfaces of the movable member. This avoids the creation of any significant forces due to flow effects. Further, the taper of peripheral surface 58 of the movable member avoids flow and pressure effects that would tend to resist movement of the movable member.

The control element provides precise and predictable flow control in response to the power delivered to the proportional solenoid. As a result, the expansion valve of the present invention may be used to achieve more accurate control of the cooling characteristics when used in an air conditioning or other heat transfer system.

Figure 7:
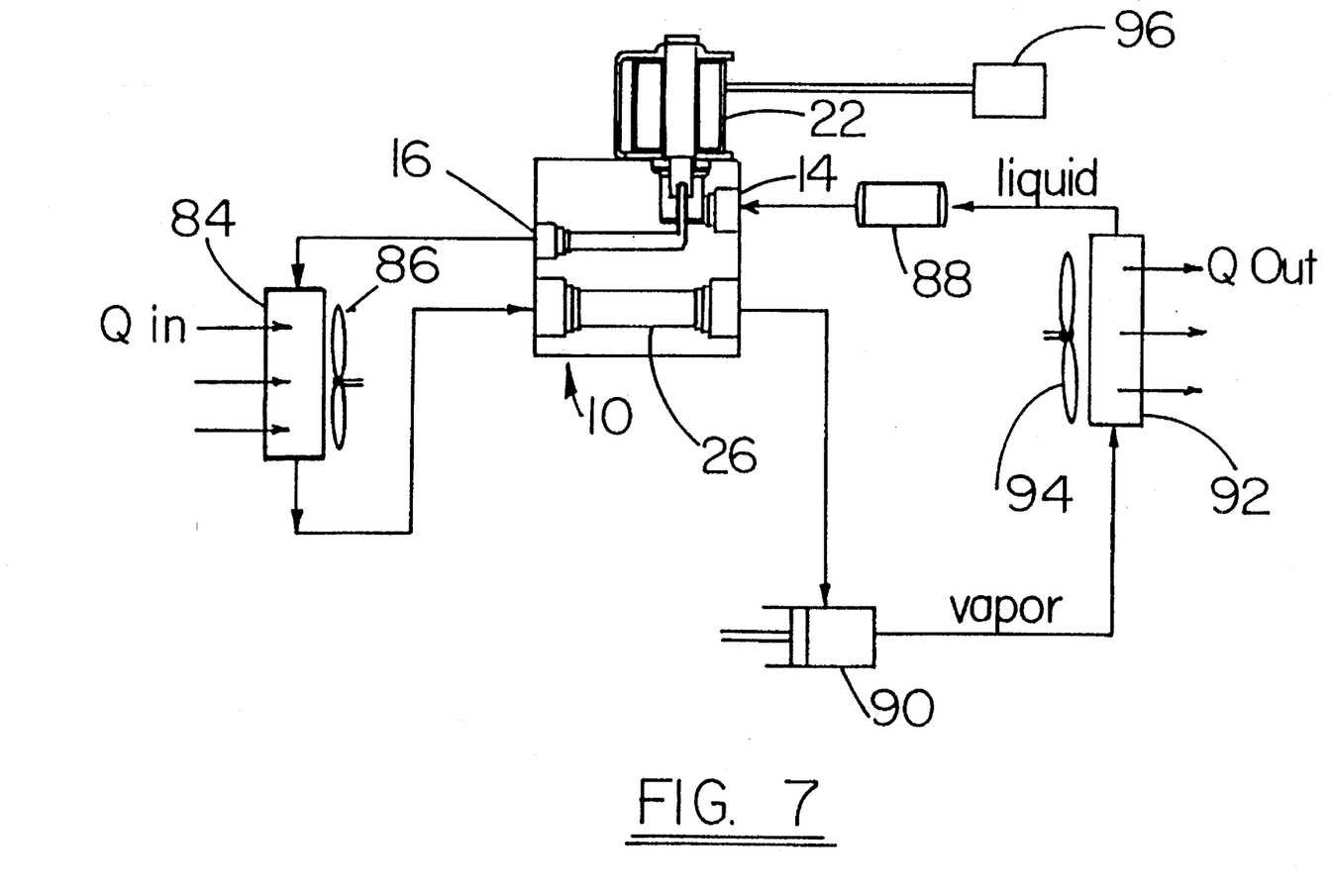
FIG. 7 is a schematic view of a heat transfer system incorporating the expansion valve of the present invention.

A typical system in which the expansion valve 10 of the present invention may be used is shown schematically in FIG. 7. Liquid working fluid enters inlet 14 of the expansion valve. The expanded refrigerant leaves the outlet 16 and is delivered in a suitable conduit to an evaporator 84. The working fluid absorbs heat as indicated by the arrows labeled Q-in, as the working fluid flows through the evaporator. Of course in the preferred form of the invention, which is an air conditioning system for a vehicle, the evaporator is in the passenger compartment or other area to be cooled. A fan 86 shown schematically reflects that air is drawn through the evaporator to assist in heat transfer.

Working fluid exiting the evaporator travels in a suitable conduit back through return passage 26 of valve 10. As previously discussed, the return passage through the valve provides a suitable location for temperature and/or pressure sensors to detect the properties of the refrigerant vapor exiting the evaporator.

The vaporized working fluid is compressed by compressor 90 and delivered in a suitable conduit to a condenser 92. In condenser 92 the working fluid loses heat as reflected by the arrows labeled Q-out. In the condenser 92 the working fluid condenses to a liquid. A fan 94 shown schematically aids in transferring heat from the working fluid as it passes through the condenser. In the preferred embodiment of the invention, which is an air conditioning system for a vehicle, heat is transferred from the working fluid to the environment.

From the condenser the liquefied working fluid is returned to the inlet 14 of the expansion valve, after first passing through a receiver-drier 88. Receiver-drier 88 serves to remove impurities, and such receiver-driers are well known to those skilled in the art.

The proportional solenoid 22 is actuated by an electronic control module shown schematically as 96. Control module 96 includes a processor and operates to deliver signals to the solenoid to selectively control the flow rate of refrigerant through the expansion valve. The control module is further electrically connected to sensors (not shown) which detect the characteristics of the working fluid as it leaves the evaporator, and perhaps other characteristics of the system, which enables the control module to calculate the appropriate amount of working fluid that should optimally pass through the expansion valve and to convert this amount into a signal. Those skilled in the art may devise numerous ways of sensing the parameters desired to be used to control the flow rate through the expansion valve and for the control module 96 to properly actuate the valve to provide the desired flow.

While the preferred embodiment of the invention includes a proportional solenoid to move the control element which controls the rate of flow through the valve, in other embodiments other types of actuators may be used. Although such actuators may not provide as precise flow control as the proportional solenoid of the preferred embodiment, the novel control element of the present invention may still be successfully used.

Figure 4:
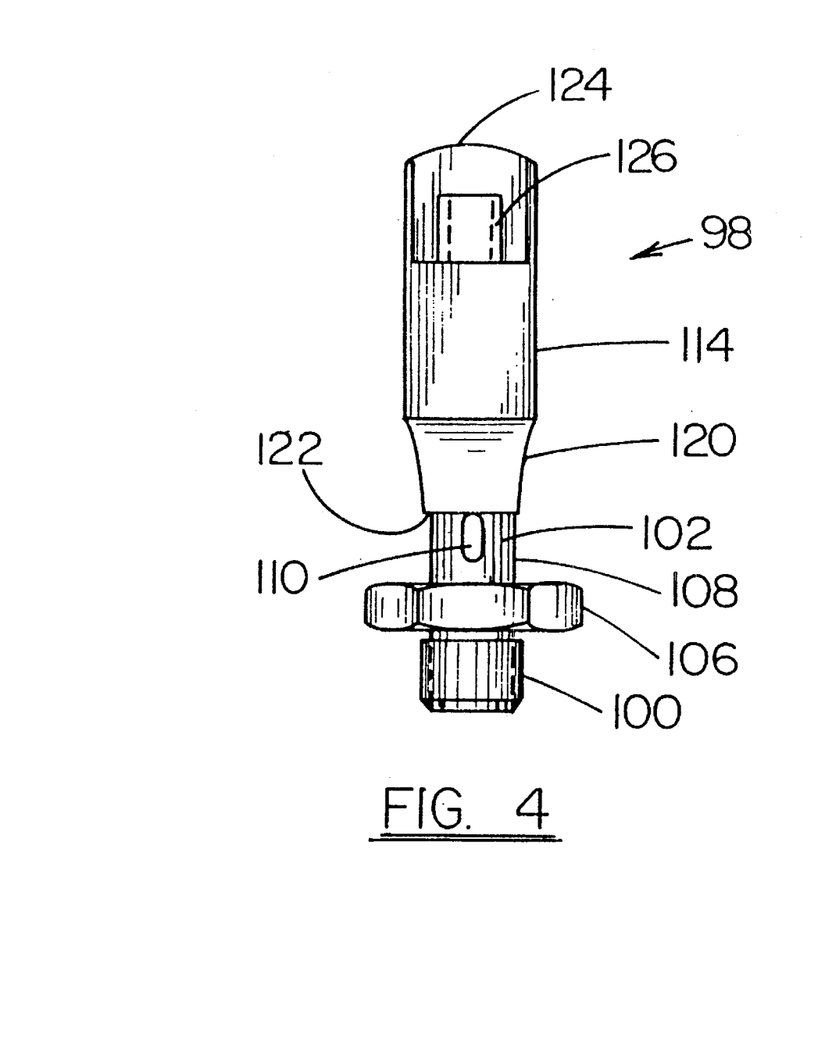
FIG. 4 is a side view of a normally open control element of an alternative embodiment of the expansion valve of the present invention.
Figure 5:
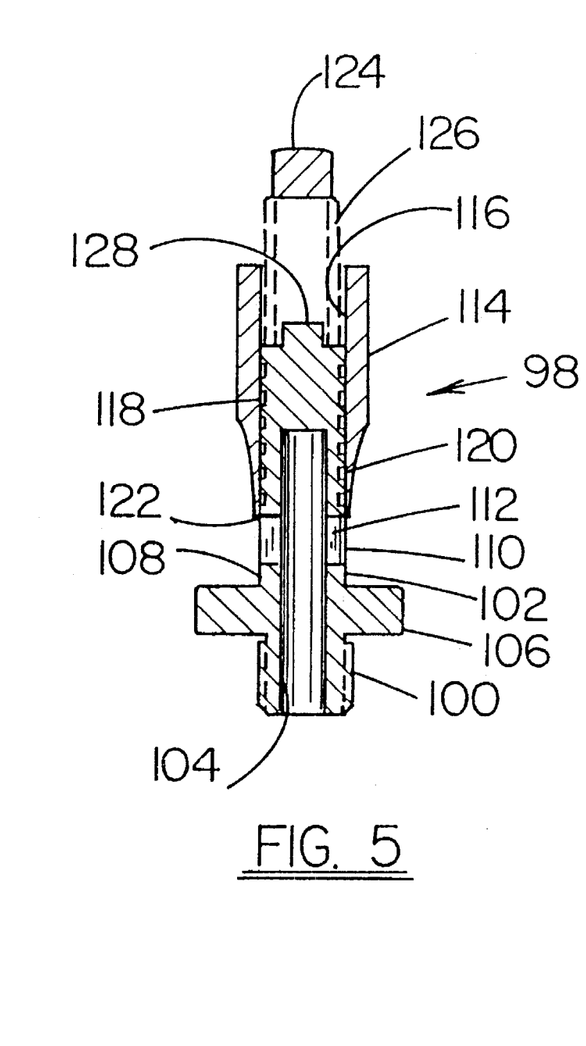
FIG. 5 is a cross sectional view of the control element shown in FIG. 4.

The embodiment of the valve shown in FIG. 1 includes a normally closed control element 20. However other embodiments of the invention may include control elements that are normally open. Such a normally opened control element 98 is shown in FIGS. 4 and 5. Control element 98 is designed to be a direct replacement for control element 20, and element 98 may be substituted in expansion valve 10 without changes to the valve construction. However the actuation of the proportional solenoid by the control module would have to be changed to reflect the different character of the control element.

Control element 98 has a threaded lower portion 100 similar to threaded portion 32 of valve element 20. Also like the previously described control element, element 98 has a stem member 102 with an internal passage 104. Control element 98 also has an external hex area 106 for ease of attachment and removal.

Control element 98 further includes a cylindrical outer surface 108. A pair of openings 110 in surface 108 are connected through ducts 112 to internal passage 104. Openings 110 are elongated longitudinally along the axis of the stem member as shown.

Control element 98 also includes a movable member 114. Movable member 114 has a cylindrical inner surface 116 slightly larger in diameter than outer surface 108. This enables the movable member to move longitudinally on the outside of the stem member. The stem member 102 also includes a plurality of ridges 118 in the area above openings 110 as shown in FIG. 5.

Movable member 114 further includes a downwardly tapered peripheral surface 120 which terminates at an edge 122 adjacent its lower end. Movable member 114 further includes a plunger engaging portion 124 for engaging plunger 24. A compression spring 126 biases the movable member in the upward direction as shown in FIGS. 4 and 5. Stem member 102 further includes a detent 128 for helping to center spring 126 in position.

In operation of an expansion valve that includes control element 98, full flow is achieved when movable member 114 is disposed in its fully upward position. This occurs when no power is delivered to the proportional solenoid and plunger 24 is disposed fully upward as shown in FIG. 1.

As electrical power to the coil of the solenoid is increased, the plunger moves downward and the movable member 114 moves similarly against the force of spring 126. As the movable member partially covers openings 110, flow through the control element is reduced. The flow is controlled by selectively moving the movable member to cover the openings to the extent desired to achieve the appropriate flow rate.

Like control element 20, control element 98 is not significantly influenced by forces generated by the flow of the refrigerant therethrough. It also provides accurate and repeatable flow based on the position of the movable member by the proportional solenoid.

A further advantage of the construction of the control elements of the present invention is that fluid may flow through the valve in either direction. This avoids the need to connect the valve with particular ports as the inlet and outlet. It is also useful in heat pump applications in which refrigerant flow is reversed.

In the preferred construction of control elements 20 and 98, a pair of opposed fluid openings in the stem member are used. These openings are elongated to provide a wide range of flow rates. In other embodiments of the invention, other numbers of openings and other configurations of openings may be used depending on the range of flow rates desired.

It will be understood by those skilled in the art that although the proportional solenoid 22 of the expansion valve of the present invention is adapted for controlling elements such as control elements 20 and 98, the proportional solenoid may also be used in other embodiments of the invention to control other types of flow control elements.

Thus, the new expansion valve for an air conditioning system of the present invention achieves the above stated objectives, eliminates difficulties encountered in the use of prior devices and systems, solves problems and attains the desirable results described herein.

In the foregoing description certain terms have been used for brevity, clarity and understanding. However, no unnecessary limitations are to be implied therefrom because such terms are for descriptive purposes and are intended to be broadly construed. Moreover, the descriptions and illustrations given are by way of examples and the invention is not limited to the exact details shown or described.

Having described the features, discoveries and principles of the invention, the manner in which it is constructed and utilized, and the advantages and useful results obtained; the new and useful methods, structures, devices, elements, arrangements, parts, combinations, systems, equipment, operations and relationships are set forth in the appended claims.

We claim:

1. A valve for controlling flow of fluid material comprising:

a body, said body including an inlet port and an outlet port;

a control element positioned fluidly intermediate of said inlet port and said outlet port in said body;

said control element comprising:

a stem member, said stem member including an internal passage, said internal passage connected to one of said ports of said valve; said stem member further having a generally cylindrical outer surface, said outer surface including a plurality of similar openings therein, said openings angularly spaced about said outer surface, said openings in fluid communication with said internal passage;

a movable member mounted for movement on said outer surface of said stem member, said movable member having an outer peripheral surface and an inner surface adjacent said outer surface of said stem, said peripheral surface tapered to a substantially thinner terminating edge adjacent said openings, said movable member disposed for movement within a range of positions between a first position wherein said edge is disposed from said openings whereby flow through said openings is enabled, intermediate positions wherein said edge is laterally adjacent said openings to regulate fluid flow therethrough, and a second position wherein said tapered peripheral surface is in substantially blocking relation with said openings.

2. The valve according to claim 1 wherein said movable member of said control element is movable longitudinally on said stem member.

3. The valve according to claim 1 wherein said openings are each in fluid communication with said internal passage of said stem member through a duct, said ducts extending substantially radially outward.

4. The valve according to claim 1 wherein said inner surface of said movable member is always slightly disposed radially from said outer surface of said stem member.

5. The valve according to claim 1 wherein said openings are equally angularly spaced about said outer surface of said stem member.

6. The valve according to claim 1 and further comprising biasing means for biasing said movable member to either said first position or said second position.

7. The valve according to claim 1 and further comprising an electrical solenoid in connection with said movable member.

8. The valve according to claim 7 wherein said solenoid includes a plunger comprised of magnetic material, said plunger selectively movable in the longitudinal direction, and wherein said movable member of said control element includes a plunger engaging portion for engaging said plunger longitudinally away from said openings in said stem member.

9. The valve according to claim 8 and further comprising biasing means for biasing said movable member of said control element to the first position, and wherein said plunger is movable in engagement with said movable member to overcome said biasing force, and wherein said peripheral surface of said movable member is disposed longitudinally intermediate of said openings and said plunger when said movable member is in the first position.

10. The valve according to claim 8 and further comprising biasing means for biasing said movable member to the second position, and wherein said plunger is movable in engagement with said movable member to overcome said biasing means, and said peripheral surface is disposed longitudinally intermediate of said plunger and said openings when said movable member is in the second position.

11. The expansion valve according to claim 9 wherein said stem member has a plurality of ducts and openings equally spaced angularly about said stem member, and wherein said openings and ducts are elongated in the longitudinal direction.

12. The expansion valve according to claim 10 wherein said stem member includes a plurality of ducts and openings equally spaced angularly about and wherein said stem member, said openings and ducts are elongated in the longitudinal direction.

13. The valve of claim 1 wherein said edge is exposed to substantial fluid flow when positioned laterally adjacent said openings, said valve operating to proportionally control fluid flow through said control element based on proportional control of said edge position adjacent said openings.

14. The valve of claim 1 wherein said edge and inner surface partially block fluid flow through said openings to regulate fluid flow therethrough, there being a substantial pressure drop between said inlet port and said outlet port, said tapered peripheral portion and edge substantially reducing fluid flow forces acting on said movable member, thereby improving control of movement of said movable member at said intermediate positions.

15. The valve of claim 7 wherein said solenoid comprises a proportional solenoid.

16. A valve for controlling the flow of fluid material therethrough comprising:

a body, said body including an inlet port and an outlet port;

a control element positioned fluidly intermediate of said inlet port and said outlet port of said body, whereby said fluid material passes through said control element;

said control element comprising:

a stem member, said stem member including an internal passage, said internal passage connected to one of said ports of said valve;

said stem member further having a generally cylindrical outer surface, said outer surface including at least one opening therethrough, said opening in fluid communication with said internal passage;

a movable member disposed for proportional movement on said outer surface of said stem member, said movable member having a tapered outer peripheral surface adjacent said opening, said peripheral surface tapered to a substantially thinner edge adjacent said outer surface of said stem, said movable member movable through a range of positions between a first position wherein said edge of said movable member is disposed from said opening whereby flow through said opening is enabled, intermediate positions wherein said edge partially covers said opening to regulate flow of fluid therethrough, and a second position wherein said tapered peripheral surface of said movable member is in substantially blocking overlying relation with said opening.

17. The valve according to claim 16 wherein said stem includes a plurality of openings equally angularly spaced about said outer surface.

18. The valve according to claim 16 wherein said peripheral surface is a conically tapered surface.

19. The valve according to claim 18 wherein said movable member has an annular inner surface interiorly of said peripheral surface, said inner surface always slightly radially disposed from said outer surface of said stem.

20. A valve for controlling the flow of fluid material therethrough comprising:

a body, said body including an inlet port and an outlet port;

a control element positioned fluidly intermediate of said inlet port and said outlet port of said body, whereby said fluid material passes through said control element;

said control element comprising:

a stem member, said stem member including an internal passage, said internal passage connected to one of said ports of said valve;

said stem member further having a generally cylindrical outer surface, said outer surface including at least one opening therethrough, said opening in fluid communication with said internal passage;

a sleeve member mounted on said outer surface of said stem member to permit relative movement between said sleeve member and said stem member, said sleeve member having a tapered outer peripheral surface adjacent said opening, said peripheral surface tapered to a subsantially edge adjacent said outer surface of said stem, said sleeve member adapted for relative movement within a range of positions between a first position wherein said edge of said sleeve member is disposed from said opening whereby flow through said opening is enabled, intermediate positions for adjusting fluid flow through said opening, and a second position wherein said tapered peripheral surface of said movable member is in substantially blocking overlying relation of said opening.

21. A valve for controlling the flow of fluid material therethrough comprising:

a body, said body including an inlet port and an outlet port;

a control element positioned fluidly intermediate of said inlet port and said outlet port of said body, whereby said fluid material passes through said control element;

said control element comprising:

a stem member, said stem member including an internal passage, said internal passage connected to one of said ports of said valve;

said stem member further having a generally cylindrical outer surface, said outer surface including at least one opening therethrough, said opening in fluid communication with said internal passage;

a movable member disposed for movement on said outer surface of said stem member, said movable member having a conically tapered outer peripheral surface adjacent said opening, said stem member extending axially through said peripheral surface and wherein a terminating edge of said peripheral surface is adjacent said outer surface of said stem, and means for permitting controlled proportional movement of said movable member within a range of positions between a first position wherein said edge of said movable member is disposed from said opening whereby flow through said opening is enabled, and a second position wherein said tapered peripheral surface of said movable member is in substantially blocking overlying relation with said opening.

22. A valve for controlling the flow of fluid material therethrough comprising:

a body, said body including an inlet port and an outlet port;

a control element positioned fluidly intermediate of said inlet port and said outlet port of said body, whereby said fluid material passes through said control element;

said control element comprising:

a stem member, said stem member including an internal passage connected to one of said ports of said valve;

said stem member further having a generally cylindrical outer surface, said outer surface including at least one opening therethrough, said opening in fluid communication with said internal passage;

a movable member mounted for relative movement on said outer surface of said stem member, said movable member having a peripheral surface tapered to an edge adjacent to said opening, said peripheral surface adjacent said opening having a contour wherein flow and pressure effect forces resulting from fluid flowing through said opening and resisting movement of said movable member are avoided;

said movable member disposed for movement through a range of positions between a first position wherein said edge of said movable member is disposed from said opening whereby flow through said opening is enabled, intermediate positions wherein said edge is exposed to fluid flow and regulates fluid flow through said opening, and a second position wherein said tapered peripheral surface of said movable member is in substantially blocking overlying relation with said opening.

* * * * *

UNITED STATES PATENT AND TRADEMARK OFFICE
CERTIFICATE OF CORRECTION

PATENT NO. : 5,460,349
DATED : October 24, 1995
INVENTOR(S) : Campbell et al.

It is certified that error appears in the above-indentified patent and that said Letters Patent is hereby corrected as shown below:

At Column 12, line 26, after "substantially", insert

—thinner—

Signed and Sealed this

Twenty-third Day of April, 1996

Attest:

BRUCE LEHMAN

*Attesting Officer*   *Commissioner of Patents and Trademarks*